US011297264B2

(12) United States Patent
Elmfors et al.

(10) Patent No.: US 11,297,264 B2
(45) Date of Patent: Apr. 5, 2022

(54) DEVICE ATTACHMENT WITH DUAL BAND IMAGING SENSOR

(71) Applicant: FLIR Systems, Inc., Wilsonville, OR (US)

(72) Inventors: Per Elmfors, Goleta, CA (US); Michael Kent, Goleta, CA (US)

(73) Assignee: TELEDYNE FUR, LLC, Thousand Oaks, CA (US)

( * ) Notice: Subject to any disclaimer, the term of this patent is extended or adjusted under 35 U.S.C. 154(b) by 912 days.

(21) Appl. No.: 15/199,867

(22) Filed: Jun. 30, 2016

(65) Prior Publication Data

US 2016/0316154 A1    Oct. 27, 2016

Related U.S. Application Data

(63) Continuation of application No. PCT/US2014/073096, filed on Dec. 31, 2014.
(Continued)

(51) Int. Cl.
*H01L 27/146* (2006.01)
*H04N 5/33* (2006.01)
(Continued)

(52) U.S. Cl.
CPC ............ *H04N 5/332* (2013.01); *G01J 5/0025* (2013.01); *G01J 5/025* (2013.01); *G01J 5/0265* (2013.01);
(Continued)

(58) Field of Classification Search
CPC .... H04N 5/332; H04N 13/128; H04N 13/246; H04N 13/156; H04N 13/296; H04N 13/239; H04N 13/25; H04N 5/2257; H04N 5/2258; H04N 13/254; H04N 2013/0081; H04N 2013/0088; H04N 5/33; H04N 5/3651; H04N 5/23206; H04N 5/232939;
(Continued)

(56) References Cited

U.S. PATENT DOCUMENTS 2,764,055 A    9/1956    Clemens et al.
5,128,796 A    7/1992    Barney et al.
(Continued)

FOREIGN PATENT DOCUMENTS

CA    2764055    7/2012
CN    2874947    2/2007
(Continued)

OTHER PUBLICATIONS

Frank et al. "Mobile Communications Device Attachment with Camera" U.S. Appl. No. 29/423,027, filed May 25, 2012, 6 pgs.
(Continued)

*Primary Examiner* — Patrick E Demosky
(74) *Attorney, Agent, or Firm* — Haynes and Boone, LLP

(57) ABSTRACT

Various techniques are disclosed for providing a device attachment configured to releasably attach to and provide infrared imaging functionality to mobile phones or other portable electronic devices. The device attachment may include an infrared imagining module and a non-thermal imaging module that cooperate with one or more of a non-thermal imaging module in an attached device and a light source in the attached device for capturing and processing images.

19 Claims, 9 Drawing Sheets

Related U.S. Application Data

(60) Provisional application No. 61/923,732, filed on Jan. 5, 2014.

(51) Int. Cl.
*G01J 5/02* (2022.01)
*G01J 5/04* (2006.01)
*G01J 5/08* (2022.01)
*H04N 5/225* (2006.01)
*H04N 13/128* (2018.01)
*H04N 13/156* (2018.01)
*H04N 13/246* (2018.01)
*H04N 13/296* (2018.01)
*H04N 13/239* (2018.01)
*H04N 13/25* (2018.01)
*G01J 5/00* (2022.01)
*G01J 5/52* (2022.01)
*H04M 1/18* (2006.01)
*H04N 13/254* (2018.01)
*H04N 13/00* (2018.01)

(52) U.S. Cl.
CPC .............. *G01J 5/0275* (2013.01); *G01J 5/04* (2013.01); *G01J 5/089* (2013.01); *G01J 5/0834* (2013.01); *G01J 5/0843* (2013.01); *G01J 5/0846* (2013.01); *G01J 5/0859* (2013.01); *G01J 5/0893* (2013.01); *G01J 5/0896* (2013.01); *G01J 5/52* (2013.01); *G01J 5/522* (2013.01); *H04N 5/2257* (2013.01); *H04N 5/2258* (2013.01); *H04N 13/128* (2018.05); *H04N 13/156* (2018.05); *H04N 13/239* (2018.05); *H04N 13/246* (2018.05); *H04N 13/25* (2018.05); *H04N 13/296* (2018.05); *G01J 2005/0048* (2013.01); *G01J 2005/0077* (2013.01); *G01J 2005/526* (2013.01); *H04M 1/185* (2013.01); *H04N 13/254* (2018.05); *H04N 2013/0081* (2013.01); *H04N 2013/0088* (2013.01)

(58) Field of Classification Search
CPC . H04N 5/23203; H04N 5/23293; G01J 5/025; G01J 5/0275; G01J 5/04; G01J 5/0834; G01J 5/0846; G01J 5/089; G01J 5/0893; G01J 5/0896; G01J 2005/0048; G01J 2005/0077; H04M 1/185; H01L 27/146
See application file for complete search history.

(56) References Cited

U.S. PATENT DOCUMENTS

| | | | |
|---|---|---|---|
| 6,297,794 B1 | 10/2001 | Tsubouchi et al. | |
| 6,330,371 B1 | 12/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 * | 10/2003 | Okamoto | G08B 25/08 340/539.11 |
| 6,681,120 B1 | 1/2004 | Kim | |
| 6,707,044 B2 | 3/2004 | Lannestedt et al. | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,470,902 B1 | 12/2008 | Kraemer et al. | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,616,877 B2 | 11/2009 | Zarnowski et al. | |
| 7,620,265 B1 | 11/2009 | Wolff et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,049,163 B1 | 11/2011 | Granneman et al. | |
| 8,153,980 B1 | 4/2012 | Brady et al. | |
| 8,208,026 B2 | 6/2012 | Hogasten et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,520,970 B2 | 8/2013 | Strandemar | |
| 8,537,343 B2 | 9/2013 | Zhang | |
| 8,565,547 B2 | 10/2013 | Strandemar | |
| 8,749,635 B2 | 6/2014 | Hogasten et al. | |
| 8,780,208 B2 | 7/2014 | Hogasten et al. | |
| 8,781,420 B2 | 7/2014 | Schlub et al. | |
| 8,825,112 B1 | 9/2014 | Fraden et al. | |
| 9,171,361 B2 | 10/2015 | Strandemar | |
| 9,235,876 B2 | 1/2016 | Hogasten et al. | |
| 9,237,284 B2 | 1/2016 | Hogasten et al. | |
| 2002/0006337 A1 | 1/2002 | Kimura et al. | |
| 2002/0058352 A1 | 5/2002 | Jacksen et al. | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0223623 A1 | 12/2003 | Gutta et al. | |
| 2004/0047518 A1 | 3/2004 | Tiana | |
| 2004/0101298 A1 | 5/2004 | Mandelbaum et al. | |
| 2004/0119020 A1 * | 6/2004 | Bodkin | G01J 3/0278 250/353 |
| 2004/0127156 A1 | 7/2004 | Park | |
| 2004/0128070 A1 | 7/2004 | Schmidt et al. | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0207036 A1 | 10/2004 | Ikeda | |
| 2004/0211907 A1 | 10/2004 | Wellman et al. | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0089241 A1 | 4/2005 | Kawanishi et al. | |
| 2005/0068333 A1 | 5/2005 | Nakahashi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |

(56) References Cited

U.S. PATENT DOCUMENTS

| | | |
|---|---|---|
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0045504 A1 | 3/2006 | Zarnowski et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0004449 A1 | 1/2007 | Sham |
| 2007/0019077 A1 | 1/2007 | Park |
| 2007/0019099 A1 | 1/2007 | Lieberman et al. |
| 2007/0019103 A1 | 1/2007 | Lieberman et al. |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0259181 A1 | 10/2008 | Yamashita et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0065695 A1* | 3/2009 | DeMarco ............... G01C 3/08 |
| | | 250/330 |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2009/0303363 A1 | 12/2009 | Blessinger |
| 2010/0020229 A1 | 1/2010 | Hershey et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0134604 A1 | 6/2010 | Kieffer et al. |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0250047 A1 | 9/2013 | Hollinger |
| 2013/0258111 A1 | 10/2013 | Frank et al. |
| 2013/0270441 A1* | 10/2013 | Burt ..................... G01J 5/0205 |
| | | 250/353 |
| 2013/0286236 A1* | 10/2013 | Mankowski ....... H04N 5/23222 |
| | | 348/222.1 |
| 2013/0320220 A1 | 12/2013 | Donowsky |
| 2013/0329054 A1 | 12/2013 | Hoelter et al. |
| 2013/0342691 A1 | 12/2013 | Lewis et al. |
| 2014/0092257 A1 | 4/2014 | Hogasten et al. |
| 2014/0098238 A1 | 4/2014 | Boulanger et al. |
| 2014/0139685 A1 | 5/2014 | Nussmeier et al. |
| 2014/0218520 A1 | 8/2014 | Teich et al. |
| 2014/0240512 A1 | 8/2014 | Hogasten et al. |
| 2014/0253735 A1 | 9/2014 | Fox et al. |
| 2014/0267768 A1* | 9/2014 | Burleigh ................ G01J 5/025 |
| | | 348/165 |
| 2014/0285672 A1 | 9/2014 | Hogasten et al. |
| 2015/0271420 A1* | 9/2015 | Neal ........................ H04N 5/33 |
| | | 348/164 |
| 2015/0334315 A1 | 11/2015 | Teich et al. |
| 2015/0358560 A1 | 12/2015 | Boulanger et al. |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 0398725 | 11/1990 |
| EP | 0837600 | 4/1998 |
| EP | 0973137 | 1/2000 |
| EP | 1983485 | 10/2008 |
| EP | 2136554 | 12/2009 |

(56) References Cited

FOREIGN PATENT DOCUMENTS

| | | |
|---|---|---|
| EP | 2477391 | 7/2012 |
| JP | 1997275518 | 4/1999 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |

(56) References Cited

FOREIGN PATENT DOCUMENTS

| | | |
|---|---|---|
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 2000/023814 | 4/2000 |
| WO | WO 03/093963 | 11/2003 |
| WO | WO 2004/027459 | 4/2004 |
| WO | WO 2005/002228 | 1/2005 |
| WO | WO 2005/015143 | 2/2005 |
| WO | WO 2005/088846 | 9/2005 |
| WO | WO 2006/112866 | 10/2006 |
| WO | WO 2007/006242 | 1/2007 |
| WO | WO 2007/053329 | 5/2007 |
| WO | WO 2008/090345 | 7/2008 |
| WO | WO 2009/122114 | 10/2009 |
| WO | WO 2010/005152 | 1/2010 |
| WO | WO 2010/033142 | 3/2010 |
| WO | WO 2012/149926 | 11/2012 |
| WO | WO 2012/170954 | 12/2012 |
| WO | WO 2014/105241 | 7/2014 |
| WO | WO 2014/159758 | 10/2014 |

OTHER PUBLICATIONS

Gangkofner et al. "Optimizing the High-Pass Filter Addition Technique for Image Fusion", Photogrammetric Engineering & Remote Sensing, vol. 74, No. 9, Sep. 1, 2008, pp. 1107-1118, XP9150814.

Ager et al. "Geo-Positional Accuracy Evaluation of QuickBird Ortho-Ready Standard 2A Multispectral Imagery", Algorithms and Technologies for Multispectral, Hyperspectral, and Ultraspectral Imagery X, vol. 5425, Aug. 12, 2004, pp. 488-499, XP040185047, Bellingham, WA.

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

* cited by examiner

DEVICE ATTACHMENT WITH DUAL BAND IMAGING SENSOR

CROSS-REFERENCE TO RELATED APPLICATIONS

This application is a continuation of International Patent Application No. PCT/US2014/073096 filed Dec. 31, 2014 and entitled "DEVICE ATTACHMENT WITH DUAL BAND IMAGING SENSOR" which is incorporated herein by reference in its entirety.

International Patent Application No. PCT/US2014/073096 claims the benefit of U.S. Provisional Patent Application No. 61/923,732 filed Jan. 5, 2014 and entitled "DEVICE ATTACHMENT WITH DUAL BAND IMAGING SENSOR" which is hereby incorporated by reference in its entirety.

U.S. patent application Ser. No. 14/281,883 filed May 19, 2014 and entitled "DEVICE ATTACHMENT WITH INFRARED IMAGING SENSOR" is hereby incorporated by reference in its entirety.

International Patent Application No. PCT/US2013/062433 filed Sep. 27, 2013 and entitled "DEVICE ATTACHMENT WITH INFRARED IMAGING SENSOR" is hereby incorporated by reference in its entirety.

U.S. Provisional Patent Application No. 61/880,827 filed Sep. 20, 2013 and entitled "DEVICE ATTACHMENT WITH INFRARED IMAGING SENSOR" is hereby incorporated by reference in its entirety.

U.S. patent application Ser. No. 13/901,428 filed May 23, 2013 and entitled "DEVICE ATTACHMENT WITH INFRARED IMAGING SENSOR" is hereby incorporated by reference in its entirety.

U.S. Provisional Patent Application No. 61/652,075 filed May 25, 2012 and entitled "DEVICE ATTACHMENT WITH INFRARED IMAGING SENSOR" is hereby incorporated by reference in its entirety.

U.S. Design Pat. application No. 29/423,027 filed May 25, 2012 and entitled "DEVICE ATTACHMENT WITH CAMERA" is hereby incorporated by reference in its entirety.

International Patent Application No. PCT/US2013/078551 filed Dec. 31, 2013 and entitled "INFRARED IMAGING DEVICE HAVING A SHUTTER" is hereby incorporated by reference in its entirety.

U.S. Provisional Patent Application No. 61/747,789 filed Dec. 31, 2012 and entitled "INFRARED IMAGING DEVICE HAVING A SHUTTER" is hereby incorporated by reference in its entirety.

U.S. patent application Ser. No. 13/966,052 filed Aug. 13, 2013 and entitled "INFRARED CAMERA SYSTEM HOUSING WITH METALIZED SURFACE" is hereby incorporated by reference in its entirety.

U.S. Provisional Patent Application No. 61/683,124 filed Aug. 14, 2012 and entitled "INFRARED CAMERA SYSTEM HOUSING WITH METALIZED SURFACE" is hereby incorporated by reference in its entirety.

International Patent Application No. PCT/US2014/059200 filed Oct. 3, 2014 and entitled "DURABLE COMPACT MULTISENSOR OBSERVATION DEVICES" is hereby incorporated by reference in its entirety.

U.S. patent application Ser. No. 14/101,245 filed Dec. 9, 2013 and entitled "LOW POWER AND SMALL FORM FACTOR INFRARED IMAGING" is hereby incorporated by reference in its entirety.

International Patent Application No. PCT/US2012/041744 filed Jun. 8, 2012 and entitled "LOW POWER AND SMALL FORM FACTOR INFRARED IMAGING" is hereby incorporated by reference in its entirety.

U.S. Provisional Patent Application No. 61/656,889 filed Jun. 7, 2012 and entitled "LOW POWER AND SMALL FORM FACTOR INFRARED IMAGING" is hereby incorporated by reference in its entirety.

U.S. Provisional Patent Application No. 61/545,056 filed Oct. 7, 2011 and entitled "NON-UNIFORMITY CORRECTION TECHNIQUES FOR INFRARED IMAGING DEVICES" is hereby incorporated by reference in its entirety.

U.S. Provisional Patent Application No. 61/495,873 filed Jun. 10, 2011 and entitled "INFRARED CAMERA PACKAGING SYSTEMS AND METHODS" is hereby incorporated by reference in its entirety.

U.S. Provisional Patent Application No. 61/495,879 filed Jun. 10, 2011 and entitled "INFRARED CAMERA SYSTEM ARCHITECTURES" is hereby incorporated by reference in its entirety.

U.S. Provisional Patent Application No. 61/495,888 filed Jun. 10, 2011 and entitled "INFRARED CAMERA CALIBRATION TECHNIQUES" is hereby incorporated by reference in its entirety.

U.S. patent application Ser. No. 14/099,818 filed Dec. 6, 2013 and entitled "NON-UNIFORMITY CORRECTION TECHNIQUES FOR INFRARED IMAGING DEVICES" is hereby incorporated by reference in its entirety.

International Patent Application No. PCT/US2012/041749 filed Jun. 8, 2012 and entitled "NON-UNIFORMITY CORRECTION TECHNIQUES FOR INFRARED IMAGING DEVICES" is hereby incorporated by reference in its entirety.

U.S. patent application Ser. No. 14/101,258 filed Dec. 9, 2013 and entitled "INFRARED CAMERA SYSTEM ARCHITECTURES" is hereby incorporated by reference in its entirety.

International Patent Application No. PCT/US2012/041739 filed Jun. 8, 2012 and entitled "INFRARED CAMERA SYSTEM ARCHITECTURES" is hereby incorporated by reference in its entirety.

U.S. patent application Ser. No. 14/138,058 filed Dec. 21, 2013 and entitled "COMPACT MULTI-SPECTRUM IMAGING WITH FUSION" is hereby incorporated by reference in its entirety.

U.S. Provisional Patent Application No. 61/748,018 filed Dec. 31, 2012 and entitled "COMPACT MULTI-SPECTRUM IMAGING WITH FUSION" is hereby incorporated by reference in its entirety.

U.S. patent application Ser. No. 14/299,987 filed Jun. 9, 2014 and entitled "INFRARED CAMERA SYSTEMS AND METHODS FOR DUAL SENSOR APPLICATIONS" is hereby incorporated by reference in its entirety.

U.S. patent application Ser. No. 12/477,828 filed Jun. 3, 2009 and entitled "INFRARED CAMERA SYSTEMS AND METHODS FOR DUAL SENSOR APPLICATIONS" is hereby incorporated by reference in its entirety.

U.S. patent application Ser. No. 14/138,040 filed Dec. 21, 2013 and entitled "TIME SPACED INFRARED IMAGE ENHANCEMENT" is hereby incorporated by reference in its entirety.

U.S. Provisional Patent Application No. 61/792,582 filed Mar. 15, 2013 and entitled "TIME SPACED INFRARED IMAGE ENHANCEMENT" is hereby incorporated by reference in its entirety.

U.S. Provisional Patent Application No. 61/746,069 filed Dec. 26, 2012 and entitled "TIME SPACED INFRARED IMAGE ENHANCEMENT" is hereby incorporated by reference in its entirety.

U.S. patent application Ser. No. 14/138,052 filed Dec. 21, 2013 and entitled "INFRARED IMAGING ENHANCEMENT WITH FUSION" is hereby incorporated by reference in its entirety.

U.S. Provisional Patent Application No. 61/793,952 filed Mar. 15, 2013 and entitled "INFRARED IMAGING ENHANCEMENT WITH FUSION" is hereby incorporated by reference in its entirety.

U.S. Provisional Patent Application No. 61/746,074 filed Dec. 26, 2012 and entitled "INFRARED IMAGING ENHANCEMENT WITH FUSION" is hereby incorporated by reference in its entirety.

U.S. patent application Ser. No. 14/246,006 filed Apr. 4, 2014 entitled "SMART SURVEILLANCE CAMERA SYSTEMS AND METHODS" is hereby incorporated by reference in its entirety.

U.S. patent application Ser. No. 13/437,645 filed Apr. 2, 2012 and entitled "INFRARED RESOLUTION AND CONTRAST ENHANCEMENT WITH FUSION" is hereby incorporated by reference in its entirety.

U.S. patent application Ser. No. 13/105,765 filed May 11, 2011 and entitled "INFRARED RESOLUTION AND CONTRAST ENHANCEMENT WITH FUSION" is hereby incorporated by reference in its entirety.

U.S. Provisional Patent Application No. 61/473,207 filed Apr. 8, 2011 and entitled "INFRARED RESOLUTION AND CONTRAST ENHANCEMENT WITH FUSION" is hereby incorporated by reference in its entirety.

U.S. patent application Ser. No. 12/766,739 filed Apr. 23, 2010 and entitled "INFRARED RESOLUTION AND CONTRAST ENHANCEMENT WITH FUSION" is hereby incorporated by reference in its entirety.

International Patent Application No. PCT/EP2011/056432 filed Apr. 21, 2011 and entitled "INFRARED RESOLUTION AND CONTRAST ENHANCEMENT WITH FUSION" is hereby incorporated by reference in its entirety.

U.S. patent application Ser. No. 14/029,716 filed Sep. 17, 2013 and entitled "ROW AND COLUMN NOISE REDUCTION IN THERMAL IMAGES" is hereby incorporated by reference in its entirety.

U.S. Provisional Patent Application No. 61/745,489 filed Dec. 21, 2012 and entitled "ROW AND COLUMN NOISE REDUCTION IN THERMAL IMAGES" is hereby incorporated by reference in its entirety.

U.S. Provisional Patent Application No. 61/745,504 filed Dec. 21, 2012 and entitled "PIXEL-WISE NOISE REDUCTION IN THERMAL IMAGES" is hereby incorporated by reference in its entirety.

U.S. patent application Ser. No. 13/622,178 filed Sep. 18, 2012 and entitled "SYSTEMS AND METHODS FOR PROCESSING INFRARED IMAGES" is hereby incorporated by reference in its entirety.

U.S. patent application Ser. No. 13/529,772 filed Jun. 21, 2012 and entitled "SYSTEMS AND METHODS FOR PROCESSING INFRARED IMAGES" is hereby incorporated by reference in its entirety.

U.S. patent application Ser. No. 12/396,340 filed Mar. 2, 2009 and entitled "SYSTEMS AND METHODS FOR PROCESSING INFRARED IMAGES" is hereby incorporated by reference in its entirety.

TECHNICAL FIELD

One or more embodiments of the invention relate generally to infrared imaging devices and more particularly, for example, to infrared imaging devices for portable equipments and, for example, to systems and methods for multi-spectrum imaging using infrared imaging devices.

BACKGROUND

Various types of portable electronic devices, such as smart phones, cell phones, tablet devices, portable media players, portable game devices, digital cameras, and laptop computers, are in widespread use. These devices typically include a visible-light image sensor or camera that allows users to take a still picture or a video clip. One of the reasons for the increasing popularity of such embedded cameras may be the ubiquitous nature of mobile phones and other portable electronic devices. That is, because users may already be carrying mobile phones and other portable electronic devices, such embedded cameras are always at hand when users need one. Another reason for the increasing popularity may be the increasing processing power, storage capacity, and/or display capability that allow sufficiently fast capturing, processing, and storage of large, high quality images using mobile phones and other portable electronic devices.

However, image sensors used in these portable electronic devices are typically CCD-based or CMOS-based sensors limited to capturing visible light images. As such, these sensors may at best detect only a very limited range of visible light or wavelengths close to visible light (e.g., near infrared light when objects are actively illuminated with light in the near infrared spectrum). As a result, there is a need for techniques to provide infrared imaging capability in a portable electronic device form factor.

SUMMARY

Various techniques are disclosed for providing a device attachment configured to releasably attach to and provide infrared imaging functionality to mobile phones or other portable electronic devices. For example, a device attachment may include a housing with a partial enclosure (e.g., a tub or cutout) on a rear surface thereof shaped to at least partially receive a user device, a multi-wavelength image sensor assembly disposed within the housing and configured to capture infrared image data and visible light image data, and a processing module communicatively coupled to the multi-wavelength sensor assembly and configured to transmit the infrared image data and/or the visible light image data to the user device.

The device attachment may be configured to cooperate with one or more components of an attached device such as a smartphone to capture and/or process image data. For example, an additional visible light camera on a smart phone attached to the device attachment may be used to capture additional visible light images that can be used, together with visible light images captured using a visible light image sensor in the device attachment, to measure distances to objects in a scene using the parallax of the objects between the two visible light image sensors. The measured distances can be used to align or otherwise combine infrared images from the infrared image sensor with the visible light images from the visible light imaging module. As another example, a light source in a smart phone attached to the device attachment may be operated to illuminate some or all of a scene to be imaged by imaging modules in the device attachment for use in combining infrared and visible light images.

A timer may be used to determine when a thermal imaging module in the device attachment can be used for determining calibrated temperatures of imaged objects.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
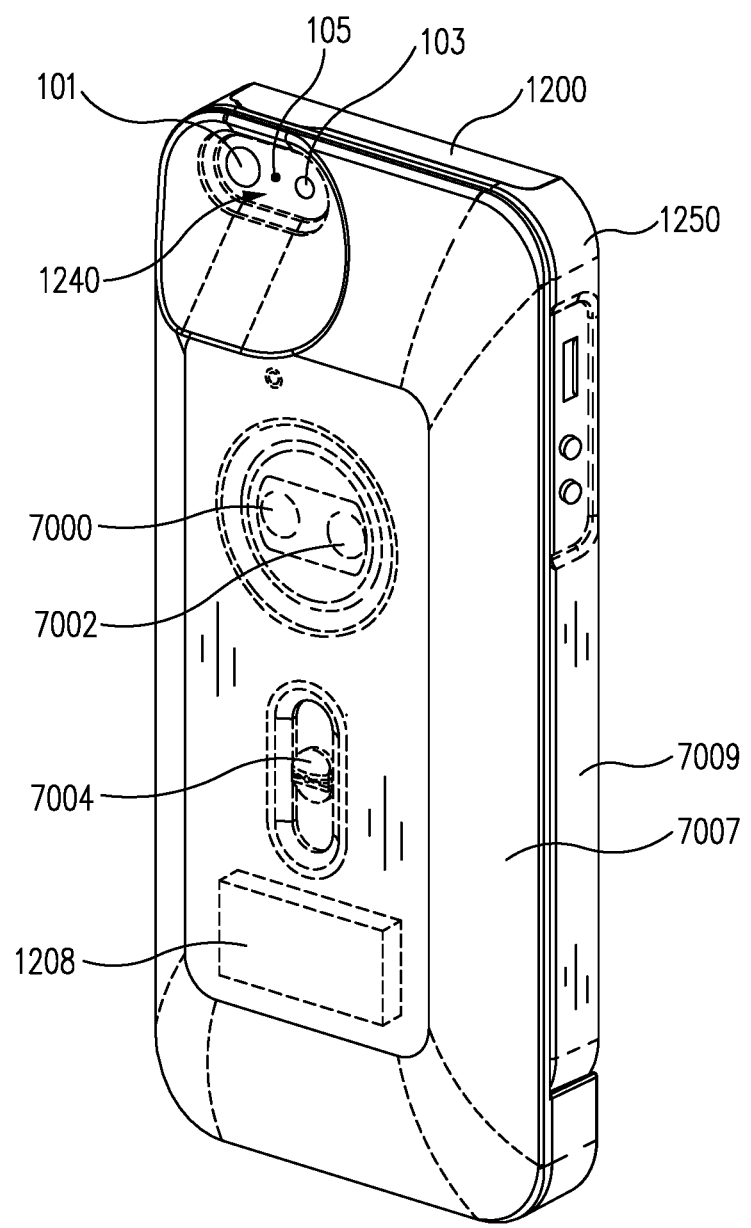
FIG. 1 illustrates a front perspective view of a device attachment in accordance with an embodiment of the disclosure.
Figure 2:
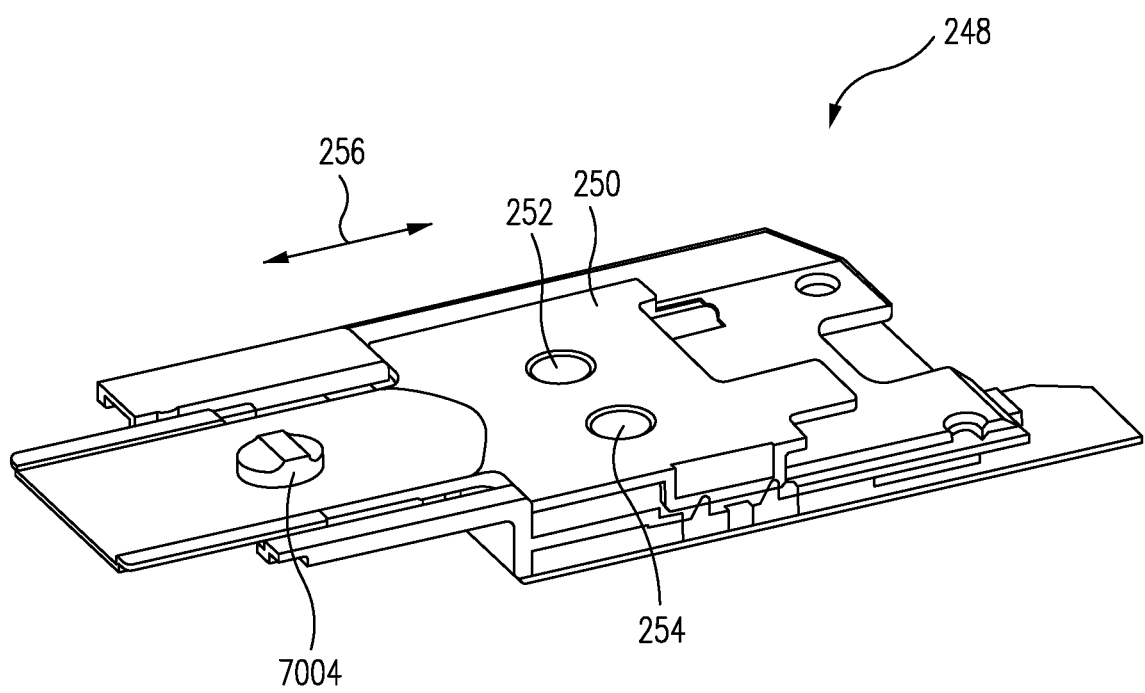
FIG. 2 illustrates a slider module of a device attachment in accordance with an embodiment of the disclosure.

Referring now to FIGS. 1 and 2, various views are shown of a device attachment 1250 having an infrared imaging module 7000 and a non-thermal camera module 7002. Infrared image sensors such as infrared imaging module 7000 can capture images of thermal energy radiation emitted from all objects having a temperature above absolute zero, and thus can be used to produce infrared images (e.g., thermograms) that can be beneficially used in a variety of situations, including viewing in a low or no light condition, detecting body temperature anomalies in people (e.g., for detecting illness), detecting invisible gases, inspecting structures for water leaks and damaged insulation, detecting electrical and mechanical equipment for unseen damages, and other situations where true infrared images may provide useful information.

Device attachment 1250 may be configured to receive a portable electronic device such as user device 1200. In the embodiment of FIG. 1, a rear perspective view of a device attachment having a shape for receiving a device 1200 from Apple, Inc.® (e.g., iPhone™ devices, iPad™ devices, or iPod Touch™ devices) is shown. However, this is merely illustrative. If desired, device attachment 1250 may have a shape suitable for receiving devices from Samsung Electronics, Ltd.® (e.g., Galaxy Tab™ devices, other Galaxy™ devices, or other devices from Samsung) or a smart phone, tablet or portable electronic device from any other manufacturer.

As shown in FIG. 1, device attachment 1250 may include a camera window 1240 through which a device camera 101 (e.g., a non-thermal camera module such as a visible light camera module) can capture images, a device light source 103 (e.g., a camera flash or flashlight) can illuminate some or all of a scene, and or one or more other sensors 105 of device 1200 can receive or emit light. Device attachment 1250 may include a plurality of imaging components such as infrared imaging module 7000 and non-thermal camera module 7002 and one or more internal electronic components such as battery 1208 or other internal components such as a processor, memory, or communications components (as examples). If desired, device attachment 1250 may also include a mechanical shutter such as a user operable shutter. The user operable shutter may be moved by a user of device attachment 1250 by sliding a button 7004 (e.g., an on/off switch) to selectively block or unblock imaging components 7000 and 7002 with an internal shutter member that is attached to button 7004.

FIG. 2 is a perspective view of a slider assembly 248 having button 7004 and a shutter member 250 with openings 252 and 254. Button 7004 may be used to push shutter member 250 along directions indicated by arrows 256 to selectively move openings 252 and 254 in front of imaging modules 7000 and 7002 of FIG. 1. When openings 252 and 254 are in front of imaging modules 7000 and 7002, imaging modules 7000 and 7002 may receive light from a scene through openings 252 and 254 for image capture operations. When button 7004 is moved so that a portion of shutter member 250 blocks imaging modules 7000 and/or 7002, light from the scene may be prevented from reaching imaging modules 7000 and/or 7002. In some embodiments, button 7004 may be configured to power device attachment 1250 on or off while moving shutter member 250 to block or unblock imaging components 7000 and 7002.

In some embodiments, shutter member 250 may be used, for example, to protect imaging components 7000 and 7002 when not in use. Shutter 250 may also be used as a temperature reference as part of a calibration process (e.g., a non-uniformity correction (NUC) process as described in U.S. patent application Ser. No. 14/099,818 filed Dec. 6, 2013 which is incorporated by reference herein in its entirety, a radiometric calibration process, and/or other calibration processes) for infrared imaging module 7000 as would be understood by one skilled in the art. Device attachment 1250 may include a front portion 7007 and a rear portion 7009. Front portion 7007 may be formed from a housing that encloses functional components of the device attachment such as a battery, connectors, imaging components, processors, memory, communications components, and/or other components of a device attachment as described herein. Rear portion 7009 may be a structural housing portion having a shape that forms a recess into which user device 1200 is configured to be releasably attached.

Figure 3:
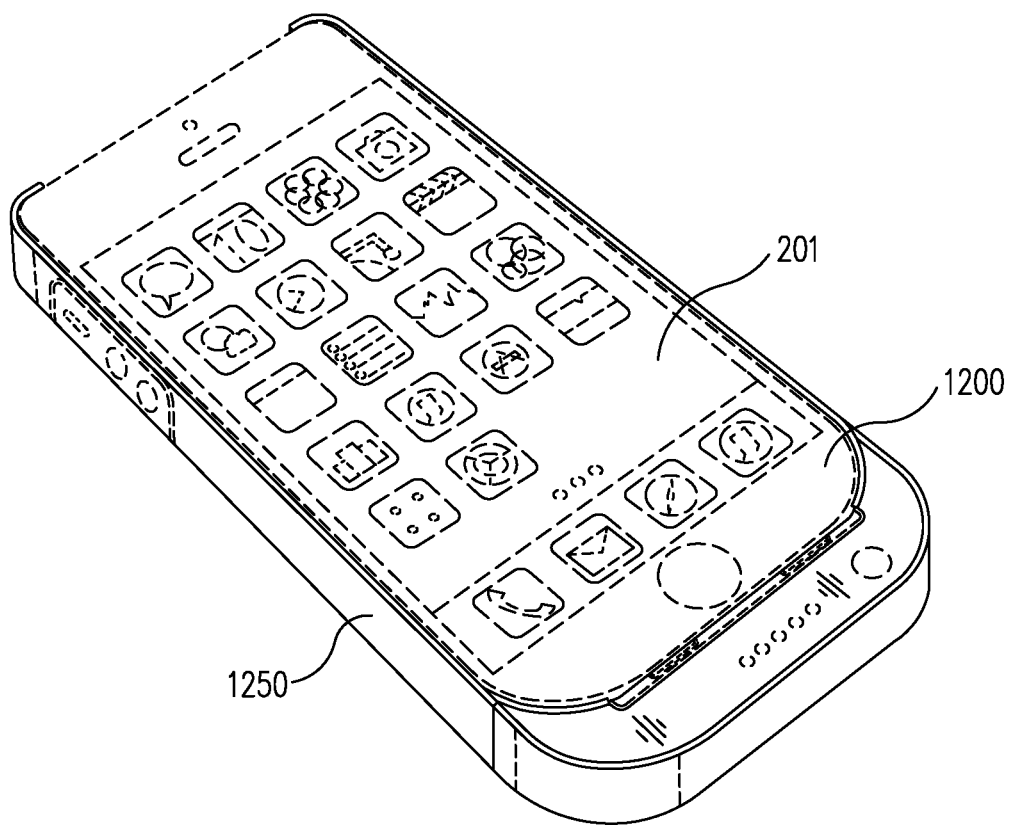
FIG. 3 illustrates a rear perspective view of a device attachment in accordance with an embodiment of the disclosure.

FIG. 3 is a front perspective view of the device attachment of FIG. 1 showing how a user device 1200 from Apple, Inc.® having a display 201 may be releasably attached to device attachment 1250 by inserting the device into a recess in a housing for the device attachment formed from a rear wall and at least one sidewall that at least partially surround the device. Device attachment 1250 may include a device connector that carries various signals and electrical power to and from user device 1200 when attached. The device connector may be disposed at a location that is suitably aligned with a corresponding device connector receptacle or socket of user device 1200, so that the device connector can engage the corresponding device connector receptacle or socket of user device 1200 when device attachment 1250 is attached to user device 1200. For example, if user device 1200 is equipped with a connector receptacle on its bottom side surface, the device connector may be positioned at an appropriate location on a bottom side wall of device attachment 1250. The device connector may also include a mechanical fixture (e.g., a locking/latched connector plug) used to support and/or align user device 1200.

The device connector may be implemented according to the connector specification associated with the type of user device 1200. For example, the device connector may implement a proprietary connector (e.g., an Apple® dock connector for iPod™ and iPhone™ such as a "Lightning" connector, a 30-pin connector, or others) or a standardized connector (e.g., various versions of Universal Serial Bus (USB) connectors, Portable Digital Media Interface (PDMI), or other standard connectors as provided in user devices).

In one embodiment, the device connector may be interchangeably provided, so that device attachment 1250 may accommodate different types of user devices that accept different device connectors. For example, various types of device connector plugs may be provided and configured to be attached to a base connector device attachment 1250, so that a connector plug that is compatible with user device 1200 can be attached to the base connector before attaching device attachment 1250 to user device 1200. In another embodiment, the device connector may be fixedly provided.

Device attachment 1250 may also communicate with user device 1200 via a wireless connection. In this regard, device attachment 1250 may include a wireless communication module configured to facilitate wireless communication between user device 1200 and device attachment 1250. In various embodiments, a wireless communication module may support the IEEE 802.11 WiFi standards, the Bluetooth™ standard, the ZigBee™ standard, or other appropriate short range wireless communication standards. Thus, device attachment 1250 may be used with user device 1200 without relying on the device connector, if a connection through the device connector is not available or not desired.

Infrared imaging module 7000 may be implemented, for one or more embodiments, with a small form factor and in accordance with wafer level packaging techniques or other packaging techniques. Infrared imaging module 7000 may include a lens barrel, a housing, an infrared sensor assembly, a circuit board, a base, and a processing module.

An infrared sensor assembly may include a plurality of infrared sensors (e.g., infrared detectors) implemented in an array or other fashion on a substrate and covered by a cap. For example, in one embodiment, an infrared sensor assembly may be implemented as a focal plane array (FPA). Such a focal plane array may be implemented, for example, as a vacuum package assembly. In one embodiment, an infrared sensor assembly may be implemented as a wafer level package (e.g., singulated from a set of vacuum package assemblies provided on a wafer). In one embodiment, an infrared sensor assembly may be implemented to operate using a power supply of approximately 2.4 volts, 2.5 volts, 2.8 volts, or similar voltages.

Infrared sensors in infrared imaging module 7000 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

User device 1200 may be any type of portable electronic device that may be configured to communicate with device attachment 1250 to receive infrared images captured by infrared sensor assembly 7000 and/or non-thermal images such as visible light images from non-thermal imaging module 7002.

Infrared image data captured by infrared imaging module 7000 and/or non-thermal image data such as visible light image data captured by non-thermal imaging module 7002 may be provided to a processing module of device attachment 1250 and/or device 1200 for further processing.

The processing module may be configured to perform appropriate processing of captured infrared image data, and transmit raw and/or processed infrared image data to user device 1200. For example, when device attachment 1250 is attached to user device 1200, a processing module may transmit raw and/or processed infrared image data to user device 1200 via a wired device connector or wirelessly via appropriate wireless components further described herein. Thus, for example, user device 1200 may be appropriately configured to receive the infrared image data (e.g., thermal image data) and/or non-thermal image data from device attachment 1250 to display user-viewable infrared images (e.g., thermograms) to users on display 201 and permit users to store infrared image data non-thermal image data, multi-wavelength image data, and/or user-viewable infrared images. That is, user device 1200 may be configured to run appropriate software instructions (e.g., a smart phone "app") to function as an infrared camera that permits users to frame and take infrared, non-infrared, and/or combined still images, videos, or both. Device attachment 1250 and user device 1200 may be configured to perform other infrared imaging functionalities, such as storing and/or analyzing thermographic data (e.g., temperature information) contained within infrared image data.

Device attachment 1250 may also include a battery 1208 (see, e.g., FIG. 1). Battery 1208 may be configured to be used as a power source for internal components of device attachment 1250, so that device attachment 1250 does not drain the battery of user device 1200 when attached. Further, battery 1208 of device attachment 1250 may be configured to provide electrical power to user device 1200, for example, through a device connector. Thus, the battery 1208 may beneficially provide a backup power for user device 1200 to run and charge from. Conversely, various components of device attachment 1250 may be configured to use electrical power from a battery of user device 1200 (e.g., through a device connector), if a user desires to use functionalities of device attachment 1250 even when the battery of device attachment 1250 is drained.

In some embodiments, a non-thermal camera module 101 of device 1200 may be used together with non-thermal camera module 7002 of device attachment 1250. When blending infrared (e.g., thermal) and non-thermal (e.g., visible) video images, the two images may be mapped to each other pixel by pixel. Differences between the two cameras (e.g., distortion, parallax, pointing angle, etc.) can be compensated. Imaging modules 7000 and 7002 may be mounted close to each other to reduce parallax differences between images captured with the imaging modules. In order to provide corrections for any remaining parallax differences, particularly for very nearby objects in an image, non-thermal camera 101 in the device 1200 can be used in conjunction with non-thermal camera module 7002 to determine the distance to the objects in a scene. The determined distance can then be used to adjust the alignment of infrared (e.g., thermal) and non-thermal (e.g., visible) video images even at variable scene distances.

Figure 4:
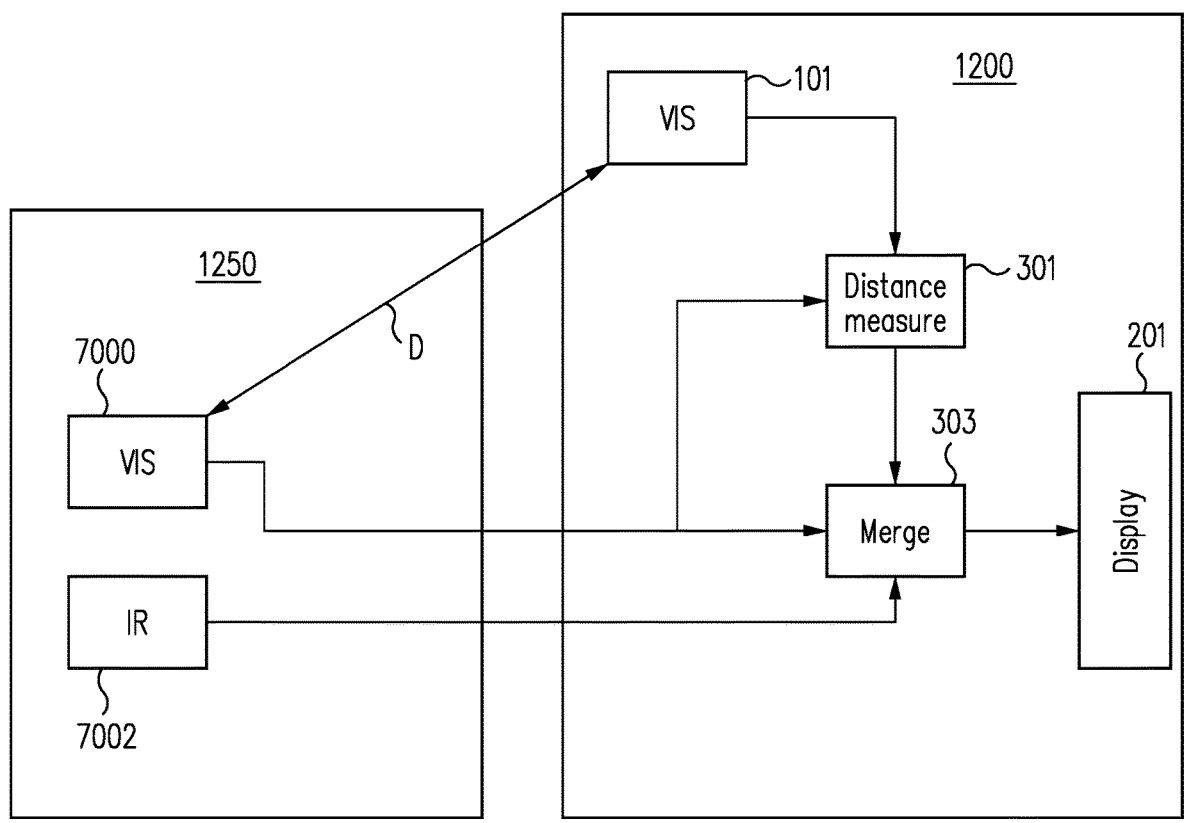
FIG. 4 illustrates a diagram of a device attachment and an attached device showing how non-thermal image data from the device attachment and the attached device can be used in merging non-thermal and thermal image data from the device attachment in accordance with an embodiment of the disclosure.

As shown in FIG. 4, non-thermal camera module 7002 and non-thermal camera module 101 can each provide a non-thermal (e.g., visible) image of a scene to processing circuitry such as distance measure engine 301. Distance measure engine 301 can determine the distance to scene objects using the known distance D between non-thermal camera module 7002 and non-thermal camera module 101 and a measured shift in position of the scene objects in the images provided by non-thermal camera module 7002 and non-thermal camera module 101.

The measured distance, the non-thermal image captured by non-thermal imaging module 7002, and a thermal image (e.g., an infrared image) from thermal imaging module 7000 can be provided to processing circuitry such as merge engine 303. Merge engine 303 can use the measured distance to correct any remaining parallax differences between the thermal image and the non-thermal image so that the thermal image and the non-thermal image can be combined and provided to display 201 for display to a user. Distance measure engine 301 and merge engine 303 may represent algorithms performed by a logic device (e.g., a programmable logic device or microprocessor).

Figure 5:
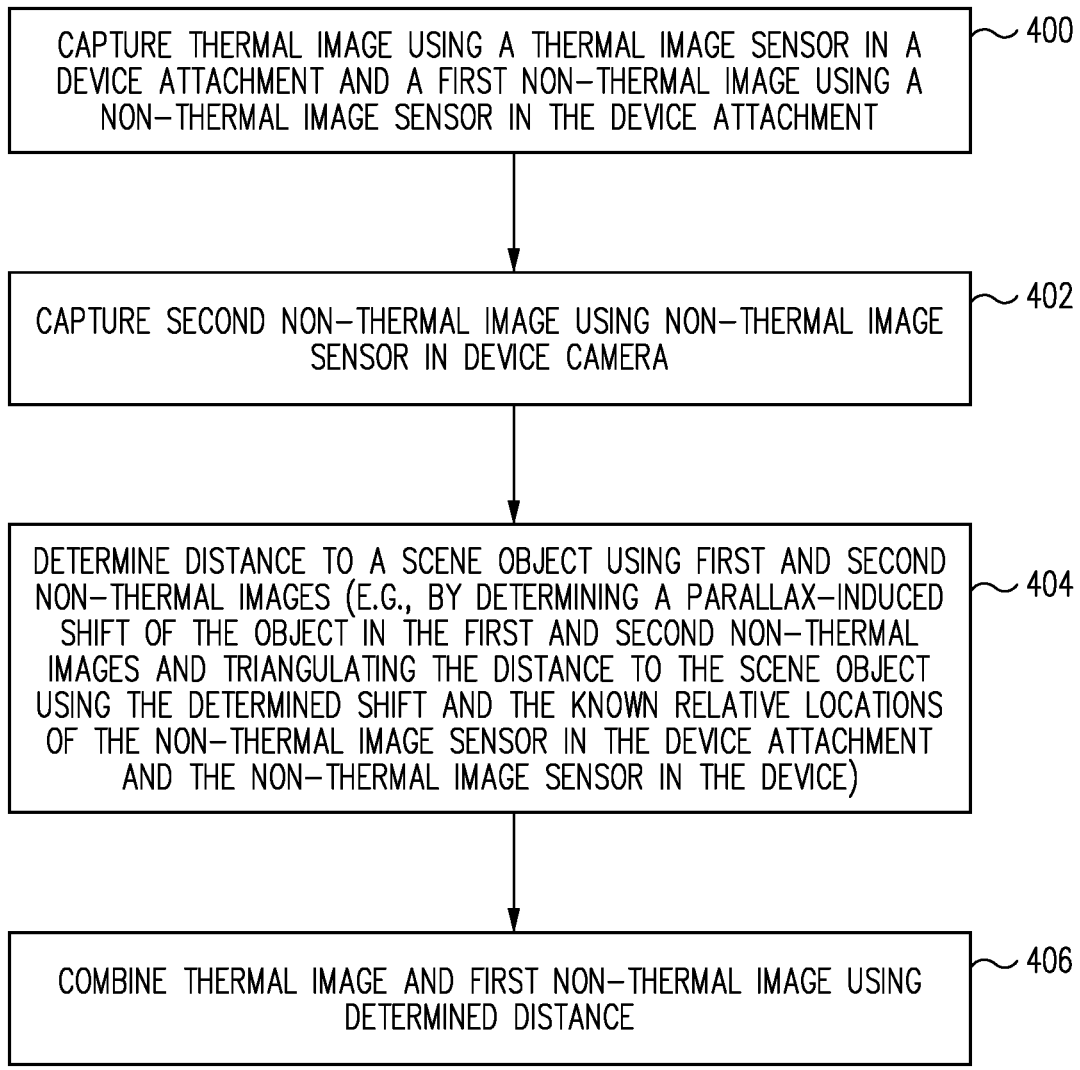
FIG. 5 illustrates a flow diagram of various operations for using non-thermal image data from a device attachment and an attached device in merging non-thermal and thermal image data from the device attachment in accordance with an embodiment of the disclosure.

FIG. 5 is a flow chart of illustrative operations for using a non-thermal imaging module in a device attachment and a non-thermal imaging module in an attached device to provide a parallax correction for images captured by the non-thermal imaging module in a device attachment and a thermal imaging module in the device attachment.

At block 400, a first non-thermal image may be captured using a non-thermal image sensor in the device attachment and, optionally, a thermal image may be captured using a thermal image sensor in the device attachment.

At block 402, a second non-thermal image may be captured using a non-thermal image sensor in a device camera.

At block 404, a distance may be determined to a scene object using the first and second non-thermal images (e.g., by determining a parallax-induced shift of the object in the first and second non-thermal images and triangulating the distance to the object using the determined shift and the known relative locations of the non-thermal image sensor in the device attachment and the non-thermal image sensor in the device). The known relative locations may be determined based on the known positions of the non-thermal image sensors in each respective device and the known position of the device within the device attachment and/or based on a calibration operation performed by capturing an image of an object at a known distance using both of the non-thermal image sensors and determining the relative locations of the non-thermal image sensors using the images of the object and the known distance.

In some embodiments, the capturing of the non-thermal images may be controlled to improve accuracy of determining a parallax-induced shift between the first and second non-thermal images, which in turn would improve the accuracy of the determined distance and the parallax correction. For example, if the first and second non-thermal images are captured while the user and/or the object are in motion, the accuracy of determining a parallax-induced shift may be affected due to a shift and/or blurring of the objects in the images caused by the motion. Such a motion-induced shift may occur, for example, if the timing of the capturing by the first and second non-thermal image sensors is not adequately synchronized.

Thus, in one embodiment, operations of FIG. 5 may involve detecting a movement of the device and/or device attachment (e.g., by an accelerometer or other types of motion detector provided in the device and/or the device attachment) and/or detecting a movement of a target object in the scene (e.g., by processing captured images as would be understood by one skilled in the art). In this embodiment, the non-thermal images may be captured when the detected movement is below a desired threshold and/or the captured images synchronized to obtain non-thermal images less affected by motion.

In another embodiment, operations of FIG. 5 may involve capturing multiple frames of non-thermal images by the first and second non-thermal image sensors, respectively, while operating a light source (e.g., light source 103 of user device 1200) to flash (e.g., illuminate for a short period of time) all or some of the scene. The frames captured by the first non-thermal image sensor may be processed to detect and select a frame containing an image of the flashed scene. Similarly, a frame containing an image of the flashed scene (e.g., a frame at the start, middle, or end of the flash event) may be detected and selected. In this way, for example, the selected frames may be substantially synchronized to the moment (or some moment in time) when the scene was illuminated, thereby reducing the effects, if any, of a motion-induced shift (e.g., achieve sufficient synchronization of the captured images).

At block 406, the thermal image and the first non-thermal image may be combined using the determined distance to the object (e.g., by performing a parallax correction between the thermal image and the first non-thermal image using the determined distance).

In order to improve the parallax corrections determined using the non-thermal camera module in the device attachment and the non-thermal camera module in the device, any distortion and alignment error between the non-thermal camera module in the device attachment and the non-thermal camera module in the device can be calibrated. For example, an image may be captured of an object such as a hand in front of a thermally and visually uniform background using the non-thermal camera module in the device attachment, the thermal imaging module in the device attachment, and the non-thermal camera module in the device. Processing circuitry (e.g., a smartphone app running on the device processor) can be used to match the edges of the hand in all three images and correlate the alignment between two non-thermal camera modules to a factory calibrated alignment between the non-thermal camera module in the device attachment and the thermal imaging module in the device attachment.

Figure 6:
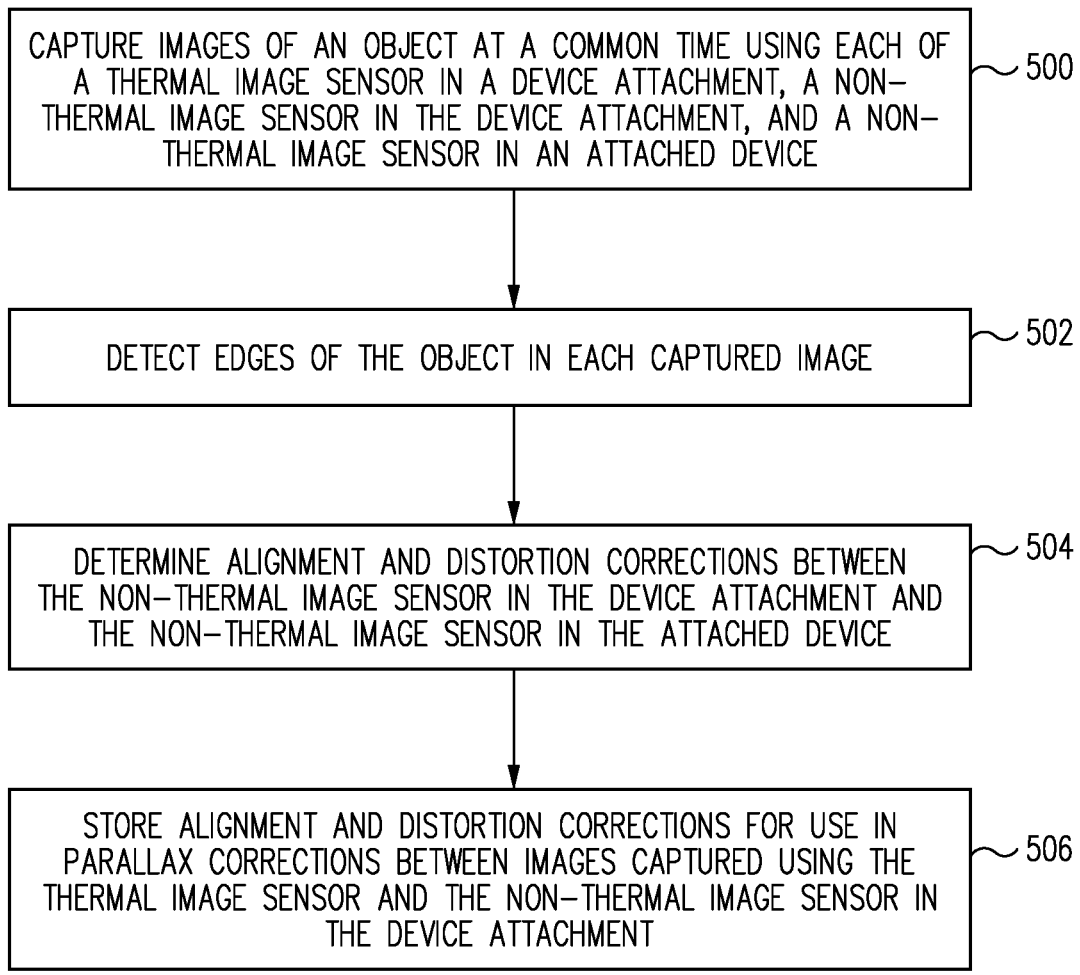
FIG. 6 illustrates a flow diagram of various operations for calibrating non-thermal image data from a device attachment and an attached device for later use in merging non-thermal and thermal image data from the device attachment in accordance with an embodiment of the disclosure.

FIG. 6 is a flowchart of operations for calibrating a distortion and/or alignment between a non-thermal camera module in the device attachment and a non-thermal camera module in the device.

At block 500, images may be captured of an object (e.g., a hand) at a common time using each of a thermal image sensor in a device attachment, a non-thermal image sensor in the device attachment, and a non-thermal image sensor in an attached device.

At block 502, edges of the object in each captured image may be detected.

At block 504, alignment and distortion corrections between the non-thermal image sensor in the device attachment and the non-thermal image sensor in the attached device may be determined based on the locations in the images of the detected edges.

At block 506, the alignment and distortion corrections may be stored (e.g., in the device attachment or the device) for use in distance measurements for parallax corrections between images captured using the thermal image sensor and the non-thermal image sensor in the device attachment.

While various embodiments illustrated above with reference to FIGS. 5 and 6 were described in relation to utilizing a non-thermal image sensor in a user device (e.g., a phone camera) and a thermal image sensor and a non-thermal image sensor in a device attachment, it is also contemplated that the principles and spirit of the present disclosure may be applied to any other appropriate combination of image sensors in the user device and/or the device attachment. For example, in case a thermal image sensor may additionally or alternatively be provided in a user device, a non-thermal image sensor of the user device and a non-thermal image sensor of a device attachment for the user device may be utilized to provide a parallax correction between the thermal image sensor of the user device and the non-thermal image sensor of either the user device or the device attachment. In another example, for a user device that may include two or more non-thermal image sensors (e.g., for stereoscopic imaging or other purposes), the non-thermal image sensors of the user device may be utilized to provide parallax correction for image sensors of the device (and/or the device attachment if present).

In some embodiments, thermal imaging module 7000 may be used to determine an image-based calibrated temperature of an object (e.g., by capturing one or more calibrated thermal images and determining from the intensity and/or spectrum of the object in the thermal images, the temperature of the object as would be understood by one skilled in the art). The accuracy of this type of image-based temperature measurement can be improved by ensuring that the thermal imaging module has been recently calibrated when an image-based temperature measurement is to be made.

Figure 7:
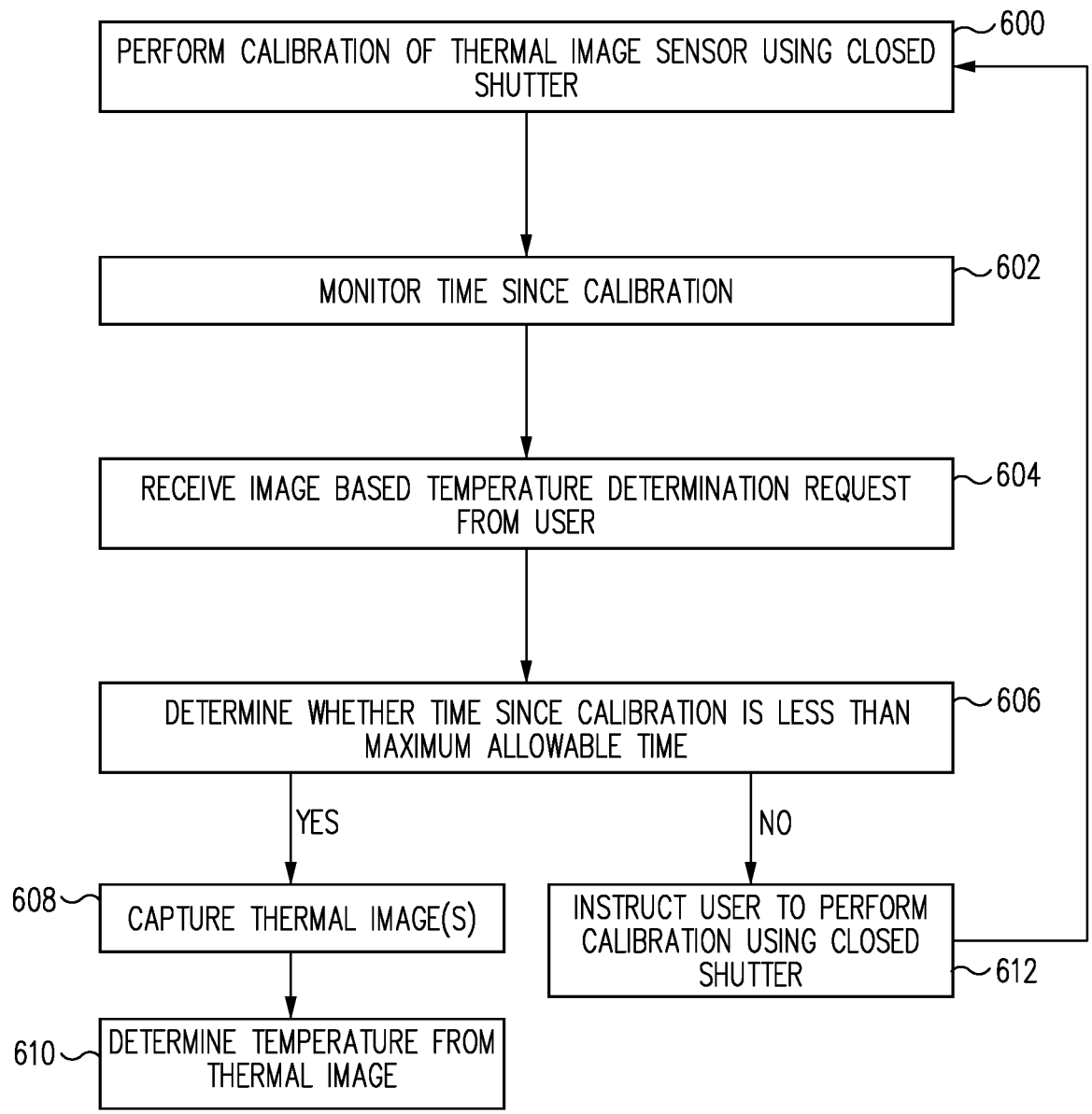
FIG. 7 illustrates a flow diagram of various operations for using a time since a calibration for determining whether calibrated image-based temperatures can be determined in accordance with an embodiment of the disclosure.

FIG. 7 is a flow chart of illustrative operations for ensuring that the thermal imaging module has been recently calibrated when an image-based temperature measurement is to be made.

At block 600, a system such as a system that includes a device attachment having a thermal image sensor and an attached device may perform a calibration of a thermal image sensor such as a thermal image sensor in a device attachment using a closed shutter (e.g., by closing the shutter and capturing one or more images of the shutter using the thermal image sensor).

At block 602, the system may monitor the time since the last calibration of the thermal image sensor (e.g., by a processor in the device attachment or a processor in an attached device).

At block 604, the system may receive a request for an image-based temperature determination from a user.

At block 606, the system may determine whether the time since calibration is less than a maximum allowable time using the monitored time. The maximum allowable time may be, as examples, less than 20 seconds since the last calibration, less than 10 seconds since the last calibration, less than one minute since the last calibration or less than 30 seconds since the last calibration. In response to determining that the time since the last calibration is less than the maximum allowable time, the system may proceed to block 608.

At block 608, one or more thermal images and/or an infrared spectrum of an object may be captured.

At block 610, the system may determine the temperature of the object from thermal images and/or the infrared spectrum.

If it is determined at block 606 that the time since the last calibration is greater than the maximum allowable time, the system may proceed to block 612.

At block 612, the system may instruct user to perform a new calibration of the thermal imaging module using the closed shutter to ensure that the subsequent temperature measurement is accurate.

In some embodiments, a light source in a portable electronic device that is attached to a device attachment having a thermal imaging module may be used in cooperation with the thermal imaging module and a non-thermal imaging module to enhance imaging of a scene. For example, light source 103 of device 1200 (see FIG. 1) may be used to illuminate at least a portion of a scene in a spectrum sensed by one or more of imaging modules 7000, 7002, and/or 101. Light source 103 can be flashed or operated in a flashlight mode to illuminate some or all of the scene during image capture operates using imaging modules 7000 and 7002. Light source 103 may be turned on and/or flashed in response to user input or may be automatically turned on and/or flashed based on, for example, a light level determined using imaging module 7002, device camera 101, or other light sensor.

Figure 8:
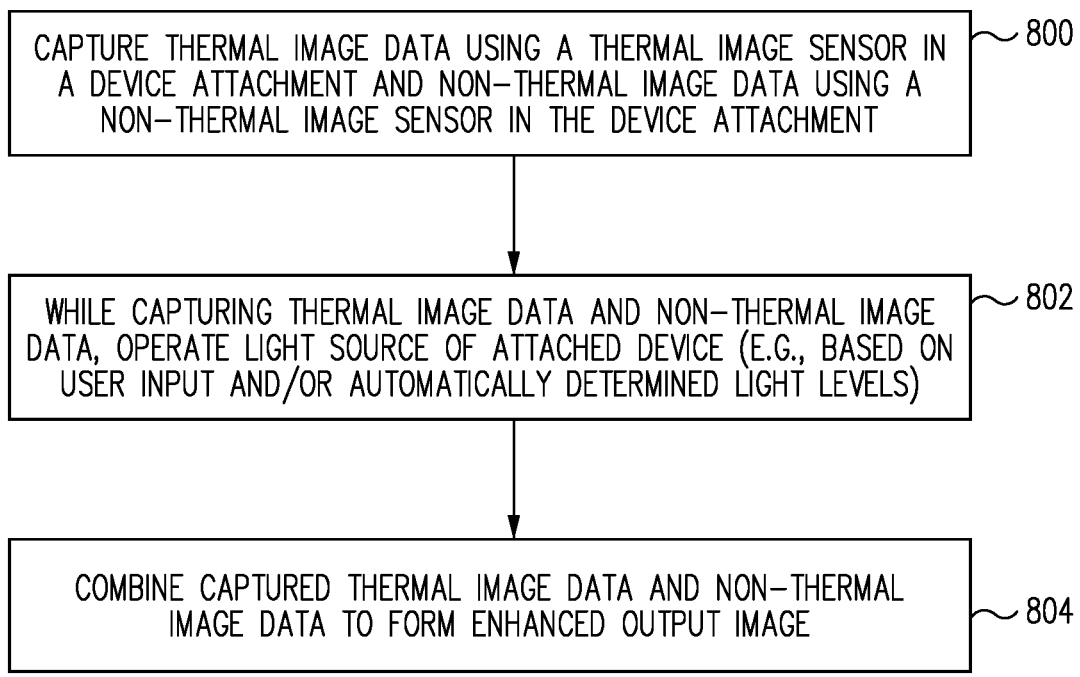
FIG. 8 illustrates a flow diagram of various operations to enhance imaging of a scene in accordance with an embodiment of the disclosure.

FIG. 8 illustrates a flow diagram of various operations to enhance imaging of a scene using thermal images and active illumination of the scene according to an embodiment.

At step 800, thermal image data may be captured using a thermal image sensor in a device attachment and non-thermal image data may be captured using a non-thermal image sensor in the device attachment. If desired, additional non-thermal image data may be captured using a camera in an attached device.

At step 802, while capturing the thermal image data and the non-thermal image data using the device attachment, a light source of an attached device may be operated. The light source may be operated (e.g., flashed or held on) during image capture operations based on, for example, user input and/or automatically determined light levels. Illuminating the scene using the light source may enhance the non-thermal images captured by the non-thermal image sensor in the device attachment.

At step 804, the captured thermal image data and the captured non-thermal image data from the device attachment may be combined to form an enhanced output image that includes some or all of the thermal image data and actively illuminated non-thermal image data. In some embodiments, thermal and non-thermal images may be processed to generate combined images using high contrast processing.

Regarding high contrast processing, high spatial frequency content may be obtained from one or more of the thermal and non-thermal images (e.g., by performing high pass filtering, difference imaging, and/or other techniques). A combined image may include a radiometric component of a thermal image and a blended component including infrared (e.g., thermal) characteristics of a scene blended with the high spatial frequency content, according to a blending parameter, which may be adjustable by a user and/or machine in some embodiments. In some embodiments, high spatial frequency content from non-thermal images may be blended with thermal images by superimposing the high spatial frequency content onto the thermal images, where the high spatial frequency content replaces or overwrites those portions of the thermal images corresponding to where the high spatial frequency content exists. For example, the high spatial frequency content may include edges of objects depicted in images of a scene, but may not exist within the interior of such objects. In such embodiments, blended image data may simply include the high spatial frequency content, which may subsequently be encoded into one or more components of combined images.

For example, a radiometric component of thermal image may be a chrominance component of the thermal image, and the high spatial frequency content may be derived from the luminance and/or chrominance components of a non-thermal image. In this embodiment, a combined image may include the radiometric component (e.g., the chrominance component of the thermal image) encoded into a chrominance component of the combined image and the high spatial frequency content directly encoded (e.g., as blended image data but with no thermal image contribution) into a luminance component of the combined image. By doing so, a radiometric calibration of the radiometric component of the thermal image may be retained. In similar embodiments, blended image data may include the high spatial frequency content added to a luminance component of the thermal images, and the resulting blended data encoded into a luminance component of resulting combined images. The non-thermal image may be from any type of non-thermal imager, including for example a visible light imager, a low light visible light imager, a CCD imaging device, an EMCCD imaging device, a CMOS imaging device, an sCMOS imaging device, a NIR imaging device, a SWIR imaging device, or other types of non-thermal imagers (e.g., including passive or active illumination as would be understood by one skilled in the art).

For example, any of the techniques disclosed in the following applications may be used in various embodiments: U.S. patent application Ser. No. 12/477,828 filed Jun. 3, 2009; U.S. patent application Ser. No. 12/766,739 filed Apr. 23, 2010; U.S. patent application Ser. No. 13/105,765 filed May 11, 2011; U.S. patent application Ser. No. 13/437,645 filed Apr. 2, 2012; U.S. Provisional Patent Application No. 61/473,207 filed Apr. 8, 2011; U.S. Provisional Patent Application No. 61/746,069 filed Dec. 26, 2012; U.S. Provisional Patent Application No. 61/746,074 filed Dec. 26, 2012; U.S. Provisional Patent Application No. 61/748,018 filed Dec. 31, 2012; U.S. Provisional Patent Application No. 61/792,582 filed Mar. 15, 2013; U.S. Provisional Patent Application No. 61/793,952 filed Mar. 15, 2013; and International Patent Application No. PCT/EP2011/056432 filed Apr. 21, 2011, all of such applications are incorporated herein by reference in their entirety. Any of the techniques described herein, or described in other applications or patents referenced herein, may be applied to any of the various thermal devices, non-thermal devices, and uses described herein.

In some embodiments, any one of device attachment 1250 or device 1200 may be configured to receive user input indicating a portion of interest to be imaged by a first imaging module (e.g., infrared imaging module 7000), control the light source 103 to illuminate at least the portion-of-interest in a spectrum sensed by a second imaging module (e.g., visible spectrum imaging module 7002 and/or 101), receive illuminated captured images of the portion-of-interest from the second imaging module, and generate a combined image comprising illuminated characteristics of the scene derived from the illuminated captured images. In some embodiments, a thermal image may be used to detect a "hot" spot in an image, such as an image of a circuit breaker box. Light source 103 may be used to illuminate a label of a circuit breaker to provide a better image and potentially pin point the cause of the hot spot.

Figure 9:
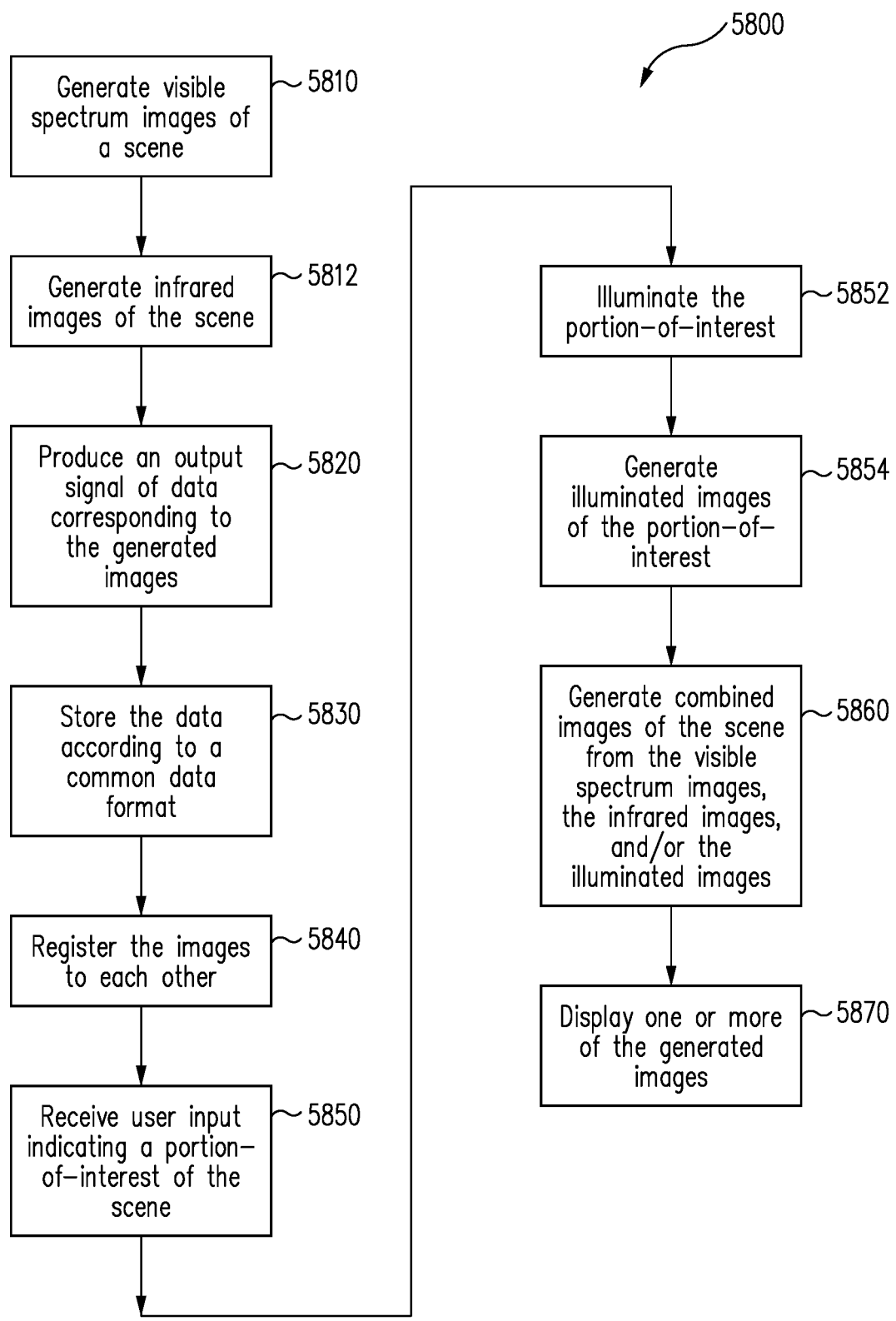
FIG. 9 illustrates a flow diagram of various operations to enhance imaging of a scene based on user input in accordance with an embodiment of the disclosure.

FIG. 9 illustrates a flow diagram of various operations to enhance imaging of a scene based on user input in accordance with an embodiment of the disclosure. For example, one or more portions of process 5800 may be performed by device attachment 1250, device 1200 and/or each of imaging modules 7000 and/or 7002 and utilizing any of the components described and/or enumerated therein. It should be appreciated that any step, sub-step, sub-process, or block of process 5800 may be performed in an order or arrangement different from the embodiment illustrated by FIG. 9.

In some embodiments, any portion of process 5800 may be implemented in a loop so as to continuously operate on a series of infrared and/or visible spectrum images, such as a video of a scene. In other embodiments, process 5800 may be implemented in a partial feedback loop including display of intermediary processing (e.g., after or while receiving infrared and/or visible spectrum images, registering images to each other, generating illuminated and/or combined images, or performing other processing of process 5800) to a user, for example, and/or including receiving user input, such as user input directed to any intermediary processing step. Further, in some embodiments, process 5800 may include one or more steps, sub-steps, sub-processes, or blocks of any of the other processes described herein.

At block 5810, device attachment 1250 generates visible spectrum images of a scene. For example, imaging module 7002 may be configured to generate one or more visible spectrum images of a scene. In some embodiments, block 5810 may include one or more operations discussed with reference to the processes of FIGS. 5-8. If desired, a device camera such as camera 101 may also capture visible spectrum images.

At block 5812, optionally at the same time as block 5810, device attachment 1250 generates infrared images of the scene. For example, imaging modules 7000 may be configured to generate one or more infrared images of the scene. In some embodiments, block 5812 may include one or more operations discussed with reference to the processes of FIGS. 5-8.

At block 5820, device attachment 1250 produces an output signal of data corresponding to the generated images. For example, any one of imaging modules 7000 or 7002 and/or a processor may be adapted to produce an output signal of data corresponding to the images generated in blocks 5810 and 5812. In some embodiments, the output signal may adhere to a particular interface standard, for example, such as MIPI®.

At block 5830, device attachment 1250 and/or device 1200 stores the data according to a common data format. For example, the data may be stored in a desired data file according to a common data format.

At block 5840, device attachment 1250 and/or device 1200 registers the images to each other. For example, device attachment 1250 and/or device 1200 may be adapted to register any one of the generated images to another one of the generated images by performing one or more of interpolation, scaling, cropping, rotational transformation, morphing, and/or filtering operations on one or more of the images to substantially match spatial content within the images. In some embodiments, device attachment 1250 and/or device 1200 may be adapted to register images to each other using one or more of the processes described in connection with FIGS. 4-6.

At block 5850, device attachment 1250 and/or device 1200 receives user input indicating a portion-of-interest of the scene. For example, device attachment 1250 and/or device 1200 may be adapted to receive user input provided by one or more other components, a touchscreen display, and/or other devices indicating a portion-of-interest of the already imaged scene. The user input may be used to designate a pixel or group of pixels corresponding to the portion-of-interest. In some embodiments, the user input may be combined with the selection of registration operations performed in block 5840 to determine corresponding pixels in a variety of captured images.

At block 5852, a light source such as light source 103 of device 1200 illuminates the portion of interest. For example, any one of device attachment 1250 and/or device 1200 may be adapted to control light source 103 to illuminate all or a designated portion of interest in a particular scene. In some embodiments, a particular spectrum and/or portion of a scene may be selected by controlling a MEMS lens and/or other system coupled or otherwise associated with an illumination module.

At block 5854, device attachment 1250 and/or device 1200 generates illuminated images of the portion-of-interest. For example, any one of imaging modules 7000, 7002, or 101 sensitive to the spectrum illuminated in block 5852 may be adapted to generate an illuminated image that is captured while light source 103 is illuminating at least the portion-of-interest designated in block 5850.

At block 5860, device attachment 1250 and/or device 1200 generates combined images of the scene from the visible spectrum images, the infrared images, and/or the illuminated images. In one embodiment, a combined image may include a visible spectrum image with embedded data corresponding to infrared image data for each pixel of visible spectrum data. When such a combined image is displayed, a user may select a pixel or group of pixels with a user interface and text corresponding to the infrared image data may be displayed alongside the visible spectrum image, such as in a text box or legend, for example. In some embodiments, any one of imaging modules 7000, 7002, and/or 101 may be adapted to generate combined images using one or more of the processes described herein, including processes described in connection with FIGS. 5-8.

At block 5870, device 1200 displays one or more of the generated images. For example, device 1200 may be adapted to use a display (e.g., display 201 in FIG. 2) to display one or more of the images generated in process 5800. In some embodiments, block 5870 may include one or more operations discussed with reference to processes of FIGS. 4-6. Embodiments described above illustrate but do not limit the invention. It should also be understood that numerous modifications and variations are possible in accordance with the principles of the invention. Accordingly, the scope of the invention is defined only by the following claims.

While various embodiments illustrated herein are described in relation to a device attachment, it should be understood that one or more embodiments of the invention are applicable also to the device solely or in conjunction with the device attachment. For example, the thermal image sensor may be implemented directly into the device (e.g., device 1200) and also optionally the additional non-thermal image sensor may be implemented within the device. Consequently, the principles taught herein may be applied based on the sensors implemented within the device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
    a device attachment comprising:
        a housing;
        an infrared sensor assembly within the housing, the infrared sensor assembly configured to capture infrared image data;
        a first non-thermal camera module within the housing, the first non-thermal camera module configured to capture non-thermal image data; and
        a processing module communicatively coupled to the infrared sensor assembly and the first non-thermal camera module; and
    a user device releasably attached to the housing of the device attachment, the user device comprising:
        a second non-thermal camera module; and
        a light source, wherein the processing module is configured to cooperate with the infrared sensor assembly, the first non-thermal camera module in the device attachment and at least one of the second non-thermal camera module in the user device or the light source to capture and process images,
    wherein the processing module is configured to determine a parallax correction for the infrared sensor assembly and the first non-thermal camera module based on a first non-thermal image from the first non-thermal camera module and a second non-thermal image from the second non-thermal camera module.

2. The system of claim 1, wherein the processing module is configured to:
    determine a distance to an object using the first non-thermal image from the first non-thermal camera module of the device attachment and the second non-thermal image from the second non-thermal camera module of the user device; and
    determine the parallax correction for the infrared sensor assembly and the first non-thermal camera module based on the determined distance.

3. The system of claim 2, wherein the processing module is configured to determine the distance based on a parallax-induced shift of the object in the first and second non-thermal images and based on a known distance between the first non-thermal camera module of the device attachment and the second non-thermal camera module of the user device.

4. The system of claim 3, further comprising the user device attached to the device attachment.

5. The system of claim 1, wherein the user device comprises a processor, and wherein the processing module of the device attachment is further configured to cooperate with the processor of the user device.

6. The system of claim 5, wherein the user device comprises a mobile phone, and wherein the light source is a light source of the mobile phone.

7. The system of claim 1, wherein the processing module is configured to combine a thermal image from the infrared sensor assembly with the first non-thermal image using the determined parallax correction, and wherein the infrared sensor assembly comprises a plurality of microbolometers.

8. A method of operating the system of claim 1, the method comprising:
    capturing the second non-thermal image using the second non-thermal camera module in the user device, wherein the user device is a portable electronic device;
    capturing the first non-thermal image using the first non-thermal camera module in the device attachment that is attached to the portable electronic device;
    determining a distance to an object using the first and second non-thermal images;
    capturing a thermal image using the infrared sensor assembly in the device attachment;
    performing the parallax correction on at least one of the thermal image or the first non-thermal image based on the determining the distance; and
    combining, following the performing, the thermal image and the first non-thermal image to form an enhanced output image.

9. The method of claim 8, further comprising providing power from a battery in the device attachment to the portable electronic device.

10. The method of claim 8, further comprising:
    operating the light source of the portable electronic device; and
    synchronizing the capturing of the first and second non-thermal images based on the operating the light source.

11. The method of claim 8, further comprising:
    monitoring a movement of the portable electronic device and the device attachment; and
    capturing the first and second non-thermal images when the movement is below a desired threshold.

12. The method of claim 8, further comprising:
    capturing additional images of an additional object using the second non-thermal camera module, the first non-thermal camera module, and the infrared sensor assembly;
    detecting edges of the additional object in each of the additional images; and
    determining, based at least on the edges in each of the additional images, alignment and distortion corrections between the second non-thermal camera module and the first non-thermal camera module for use in the performing of the parallax correction.

13. A method of operating the system of claim 1, the method comprising:
    performing a calibration operation for the infrared sensor assembly in the device attachment that is attached to the user device;
    receiving an image-based temperature determination request of an object from a user;
    in response to the image-based temperature determination request, determining whether a time since the performing is less than a maximum allowed time; and
    capturing a thermal image using the infrared sensor assembly based on the determining that the time since the performing is less than the maximum allowed time.

14. The method of claim 13, wherein the performing comprises capturing one or more images of a closed shutter of the device attachment using the infrared sensor assembly, the method further comprising:
    based on the determining that the time since the performing is greater than the maximum allowed time, providing instructions to the user to close the shutter to perform a new calibration of the infrared sensor assembly.

15. The system of claim 1, wherein the processing module is further configured to operate the light source while the infrared image data and non-thermal image data are captured to cooperate with the infrared sensor assembly, the first non-thermal camera module in the device attachment, and the light source to capture and process the images.

16. The system of claim 15, wherein the processing module is configured to combine the infrared image data and the non-thermal image data captured while the light source was operated to form an enhanced output image.

17. The system of claim 1, wherein the processing module is further configured to:
    receive the infrared image data, the non-thermal image data, and additional non-thermal image data from the second non-thermal camera module in the user device; and
    combine the infrared image data and the non-thermal image data based on a correction determined using the non-thermal image data and the additional non-thermal image data to cooperate with the infrared sensor assembly, the first non-thermal camera module in the device attachment, and the second non-thermal camera module in the user device to capture and process the images.

18. The system of claim 1, wherein the processing module is configured to cooperate with the infrared sensor assembly, the first non-thermal camera module in the device attachment, the second non-thermal camera module in the user device, and the light source to capture and process the images.

19. The system of claim 1, wherein the device attachment further comprises a battery configured to selectively provide power to the user device.

* * * * *

UNITED STATES PATENT AND TRADEMARK OFFICE
CERTIFICATE OF CORRECTION

PATENT NO. : 11,297,264 B2
APPLICATION NO. : 15/199867
DATED : April 5, 2022
INVENTOR(S) : Per Elmfors and Michael Kent It is certified that error appears in the above-identified patent and that said Letters Patent is hereby corrected as shown below:

On the Title Page

Item (73), change Assignee from "TELEDYNE FUR, LLC" to --TELEDYNE FLIR, LLC--.

In the Specification

In Column 1, Line 18, change "patent application Ser. No." to --Patent Application No.--.

In Column 1, Line 30, change "patent application Ser. No." to --Patent Application No.--.

In Column 1, Line 38, change "Pat. application." to --Patent Application--.

In Column 1, Line 50, change "patent application Ser. No." to --Patent Application No.--.

In Column 1, Line 62, change "patent application Ser. No." to --Patent Application No.--.

In Column 2, Line 25, change "patent application Ser. No." to --Patent Application No.--.

In Column 2, Line 34, change "patent application Ser. No." to --Patent Application No.--.

In Column 2, Line 43, change "patent application Ser. No." to --Patent Application No.--.

In Column 2, Line 51, change "patent application Ser. No." to --Patent Application No.--.

In Column 2, Line 55, change "patent application Ser. No." to --Patent Application No.--.

In Column 2, Line 60, change "patent application Ser. No." to --Patent Application No.--.

In Column 3, Line 5, change "patent application Ser. No." to --Patent Application No.--.

Signed and Sealed this
Twenty-eighth Day of June, 2022

Katherine Kelly Vidal
*Director of the United States Patent and Trademark Office*

CERTIFICATE OF CORRECTION (continued)
U.S. Pat. No. 11,297,264 B2

In Column 3, Line 16, change "patent application Ser. No." to --Patent Application No.--.

In Column 3, Line 20, change "patent application Ser. No." to --Patent Application No.--.

In Column 3, Line 24, change "patent application Ser. No." to --Patent Application No.--.

In Column 3, Line 31, change "patent application Ser. No." to --Patent Application No.--.

In Column 3, Line 40, change "patent application Ser. No." to --Patent Application No.--.

In Column 3, Line 51, change "patent application Ser. No." to --Patent Application No.--.

In Column 3, Line 55, change "patent application Ser. No." to --Patent Application No.--.

In Column 3, Line 59, change "patent application Ser. No." to --Patent Application No.--.

In Column 6, Line 57, change "patent application Ser. No." to --Patent Application No.--.

In Column 13, Line 52, change "patent application Ser. No." to --Patent Application No.--.

In Column 13, Line 53, change "patent application Ser. No." to --Patent Application No.--.

In Column 13, Line 54, change "patent application Ser. No." to --Patent Application No.--.

In Column 13, Line 55, change "patent application Ser. No." to --Patent Application No.--.